(12) United States Patent
Ponikiewski et al.

(10) Patent No.: US 11,034,378 B2
(45) Date of Patent: Jun. 15, 2021

(54) STEERING COLUMN ASSEMBLY

(71) Applicant: TRW Steering Systems Poland Sp. Z.o.o., Czechowice-Dziedzice (PL)

(72) Inventors: Pawel Ponikiewski, Pewel Mala (PL); Artur Wojtalik, Katowice (PL)

(73) Assignee: ZF Steering Systems Poland Z.o.o., Czechowice-Dziedzice (PL)

( * ) Notice: Subject to any disclaimer, the term of this patent is extended or adjusted under 35 U.S.C. 154(b) by 291 days.

(21) Appl. No.: 16/323,369

(22) PCT Filed: Aug. 4, 2017

(86) PCT No.: PCT/EP2017/069789
§ 371 (c)(1),
(2) Date: Feb. 5, 2019

(87) PCT Pub. No.: WO2018/024881
PCT Pub. Date: Feb. 8, 2018

(65) Prior Publication Data
US 2021/0101635 A1    Apr. 8, 2021

(30) Foreign Application Priority Data

Aug. 5, 2016 (EP) ..................................... 16461547
Mar. 31, 2017 (GB) ..................................... 1705278

(51) Int. Cl.
B62D 1/19 (2006.01)

(52) U.S. Cl.
CPC ................................... B62D 1/192 (2013.01)

(58) Field of Classification Search
CPC .. B62D 1/192; B62D 1/16; B62D 1/20; F16C 2326/24; F16C 3/035; F16D 3/06
(Continued)

(56) References Cited

U.S. PATENT DOCUMENTS 3,318,170 A * 5/1967 Runkle .................. B62D 1/185
74/493
4,572,023 A    2/1986 Euler
(Continued)

FOREIGN PATENT DOCUMENTS

CN    103600766 A *  2/2014
CN    103600766 A    2/2014
(Continued)

OTHER PUBLICATIONS

Great Britain Search Report, Application No. GB1705278.8, dated Sep. 20, 2017.
(Continued)

*Primary Examiner* — Paul N Dickson
*Assistant Examiner* — Scott F. Underwood
(74) *Attorney, Agent, or Firm* — Robert James Harwood

(57) ABSTRACT

A collapsible steering column assembly comprising a telescopic steering shaft that is supported within a steering column shroud, the telescopic steering shaft comprising a first shaft having a hollow end and a second shaft that has an end that is located within the hollow end of the first shaft. A plurality of radially-adjustable pins and a resilient contact member are axially separated along a longitudinal axis of the steering column assembly, each being adjustable for the elimination of free play between the first shaft and the second shaft. The pins transmit torque by rotationally interlocking the first shaft and the second shaft.

19 Claims, 3 Drawing Sheets

(58) Field of Classification Search
USPC ............... 464/162, 169; 74/492; 280/777
See application file for complete search history.

(56) References Cited

U.S. PATENT DOCUMENTS

| | | |
|---|---|---|
| 4,619,548 A | 10/1986 | Kazaoka et al. |
| 2009/0025503 A1 | 1/2009 | Daumal Castellon |

FOREIGN PATENT DOCUMENTS

| | | | | |
|---|---|---|---|---|
| EP | 0156114 A1 | * | 10/1985 | ............. B62D 1/184 |
| EP | 0156114 A1 | | 10/1985 | |
| EP | 1167785 A2 | | 1/2002 | |
| GB | 1096804 A | | 12/1967 | |
| GB | 1113147 A | | 5/1968 | |
| GB | 1217055 A | | 12/1970 | |
| WO | WO-2015011479 A1 | * | 1/2015 | ............. F16C 3/035 |
| WO | WO-2017016991 A1 | * | 2/2017 | ................ F16C 3/03 |

OTHER PUBLICATIONS

PCT International Search Report and Written Opinion, Application No. PCT/EP2017/069789, dated Nov. 22, 2017.

\* cited by examiner

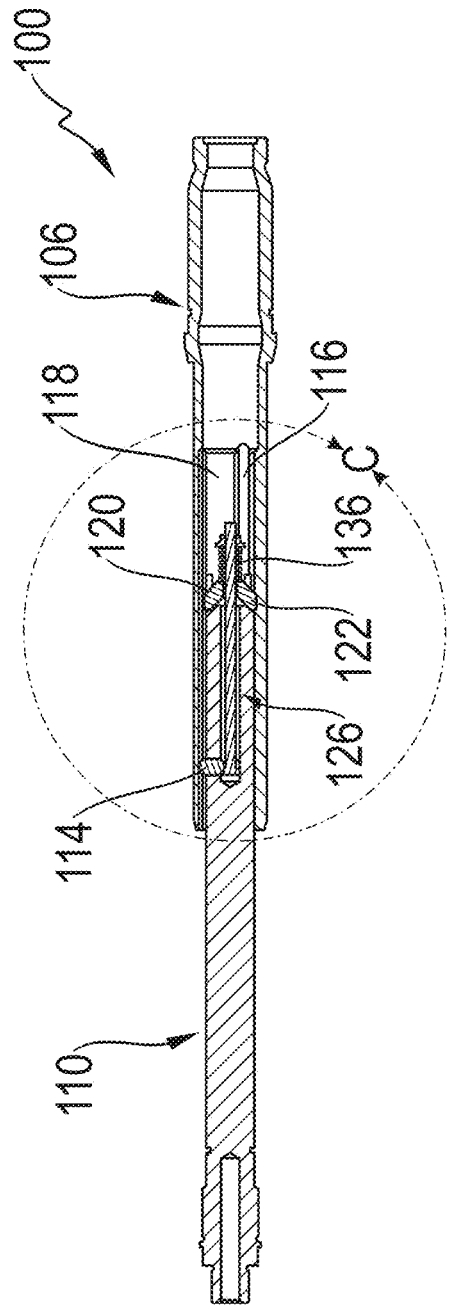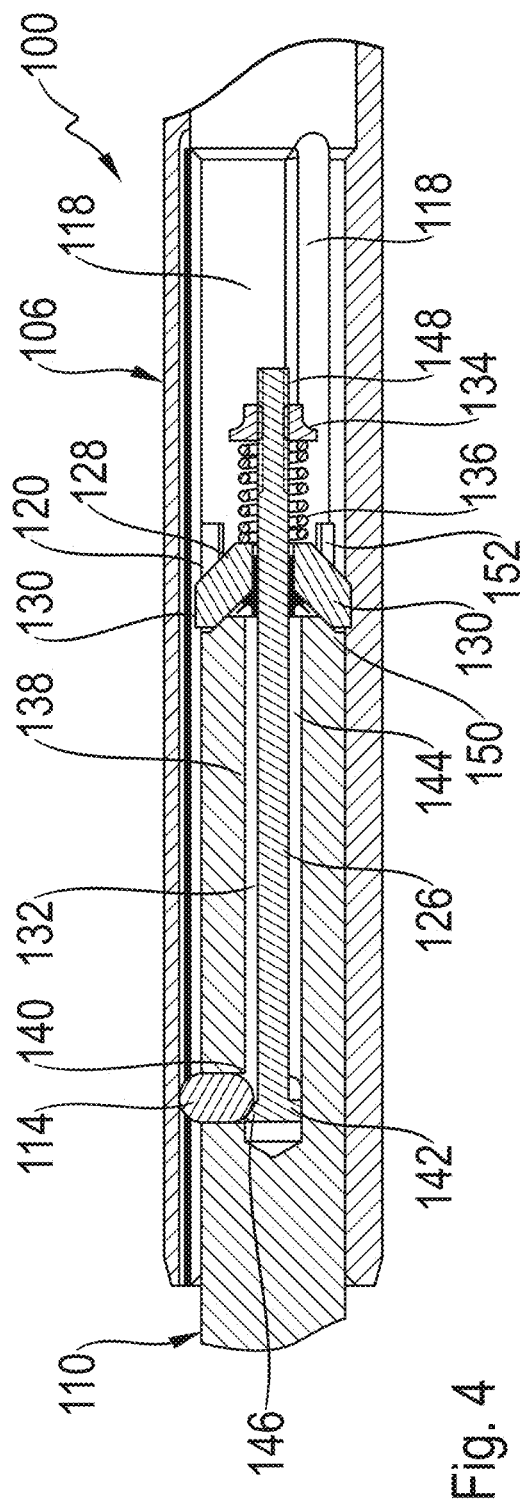

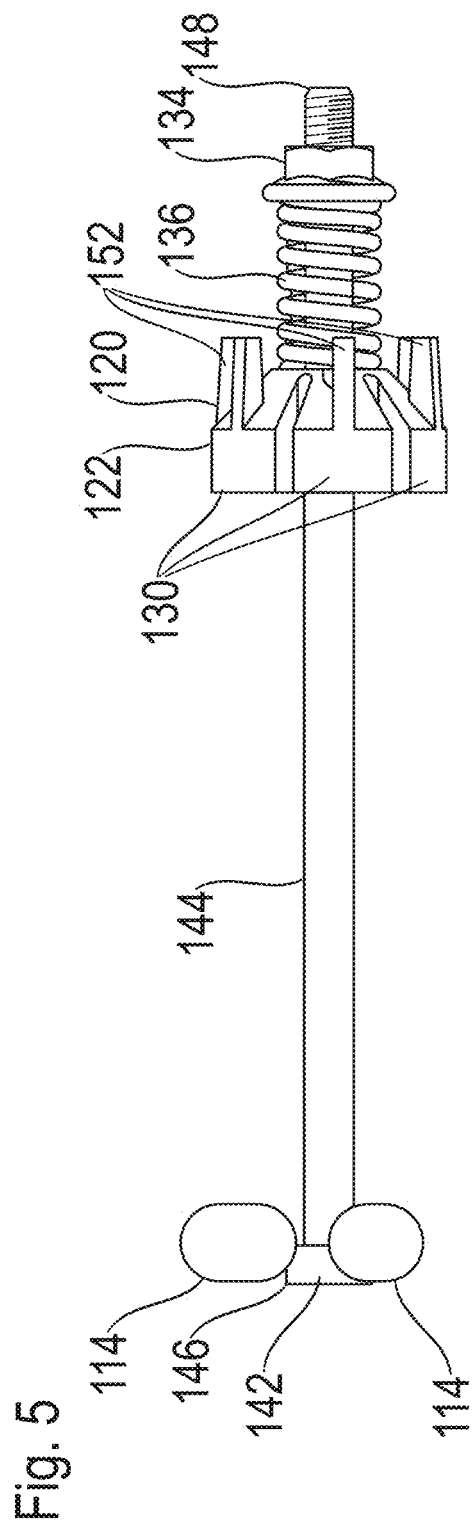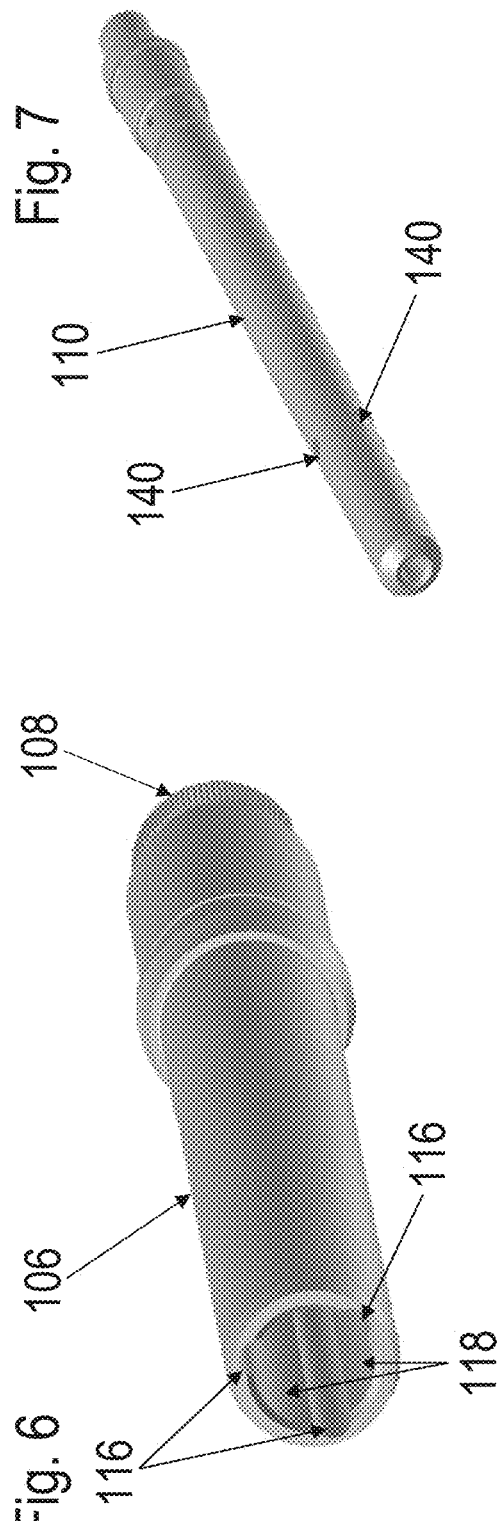

STEERING COLUMN ASSEMBLY

CROSS-REFERENCE TO RELATED APPLICATIONS

This application is a national stage of International Application No. PCT/EP2017/069789, filed 4 Aug. 2017, the disclosures of which are incorporated herein by reference in entirety, which claimed priority to Great Britain Patent Application No. 1705278.8, filed 31 Mar. 2017, the disclosures of which are incorporated herein by reference in entirety and to European Patent Application No. 16461547.8, filed 5 Aug. 2016, the disclosures of which are incorporated herein by reference in entirety.

BACKGROUND TO THE INVENTION

This invention relates to improvements in steering column assemblies.

It is known to provide a collapsible steering column assembly comprising a steering shaft that is supported within a steering column shroud. To prevent significant injury to the driver in the event of a crash the steering column should be able to collapse as an axial load is applied through the steering wheel, for instance in a front impact where an unrestrained driver is thrown onto the steering wheel.

The steering column shaft may collapse through the use of a weakened section of shaft. However, in a typical modern vehicle the steering shaft is able to collapse telescopically with a first part of the shaft sliding over a second part of the shaft. Advantageously, this same telescopic motion may be used to provide for a range of adjustment of the steering column assembly for reach. In that case, the shaft is typically supported within a shroud that is also telescopic and comprises two portions: an upper shroud portion and a lower shroud portion. A locking mechanism fixes the steering shaft at a desired length, and this is arranged typically so that it is overcome in a crash to permit the desired collapse in length.

To allow a torque to be carried across the two parts of the steering shaft, the end portion of one part of the shaft—typically the upper shaft that is nearest the steering wheel—is hollowed and provided with inwardly extending elongate splines around the circumference of the inner surface. These engage corresponding outwardly facing splines on an end of the other part of the shaft. The splines prevent relative rotation of the two parts of the shaft about their common axis whilst allowing the shafts to slide telescopically. A low friction coating may be provided on the splines in the form of an overmoulding, which also has the benefit of allowing the dimensions of the splines to be closely controlled. This is important to prevent the two parts of the shaft tilting relative to one another.

The overmoulding operation is very difficult, technically. This is because each of the upper and lower shafts may have tolerance and shape errors, meaning that the result of the overmoulding is different for each pair of shafts. In order to perform the overmoulding without undue expense and difficulty, the thickness of the overmoulding is provided as an average value, based upon analysis of sliding force and reach performance of test apparatus. Because it is an average, overall performance issues arise, leading to high reject rates, issues with natural frequency, and reach adjustment performance.

SUMMARY OF THE INVENTION

It is a feature of the present invention to provide a steering column assembly that ameliorates the known problems with the overmoulding process, whilst retaining the benefits of low lash and good torque transfer between the upper and lower shafts, along with acceptable reach adjustment performance.

In accordance with the invention, there is provided a collapsible steering column assembly comprising a telescopic steering shaft that is supported within a steering column shroud, the telescopic steering shaft comprising:

a first shaft having a hollow end;

a second shaft that has an end that is located within the hollow end of the first shaft; and a first contacting means and a second contacting means, axially separated along a longitudinal axis of the steering column assembly, each being adjustable for the elimination of free play between the first shaft and the second shaft, the first contacting means being adapted to transmit torque by rotationally interlocking the first shaft and the second shaft.

The two contacting means are adjustable to remove free play between the shafts. This adjustability can be either automatic through resilient or biased components, or can be manual through the manual adjustment or adaptation of the components. As the free play is removed in two locations along the axis of the assembly, the assembly has much better stability than would be enabled by a single contacting means. Furthermore, the transmission of torque is also handled by one of these contacting means. The adjustable removal of free play in the part transmitting the torque removes the need to provide any sort of overmoulding or other processing in order to achieve the tolerances required in the finished steering column assembly.

The first contacting means may include a plurality of radially-adjustable pins, each pin being placed under a static force and being receivable within a corresponding groove in an inwardly-facing wall of the first shaft, the radially-adjustable pins transmitting torque between the first shaft and the second shaft.

Radial movement of the pins can therefore compensate for variance in the relative sizes of the first and second shafts and also the size or depth of the grooves. Thus, even when the manufacturing is imperfect, or the assembly wears through use, the pins will be able to adjust to remove the free play in the assembly.

Each pin may be located in an aperture in the second shaft. By doing so, the pins can be held in specific locations and allowed to move radially without movement in any other direction relative to the second shaft.

The radially-adjustable pins may be placed under the static force by a chamfered element that contacts an inner radial end of each pin, the chamfered element being biased in a direction such that the radially-adjustable pins are biased in a radially-outward direction.

The said second contacting means includes a resilient contact member that is placed under a force, the magnitude of the force setting the outer dimension of the resilient contact member. The resilient contact member preferable contacts an inwardly-facing wall of the first shaft.

The resilience of the contact member ensures that vibration can be absorbed as well as free play, giving further stability to the assembly.

The resilient contact member may include a hub portion and a plurality of radially extending fingers or petals that project away from the hub portion and form a generally conical or frusto-conical shape, the force causing the petals to splay to contact the inwardly-facing wall.

The second shaft may include a bore, a bolt being receivable within the bore and interconnecting the first and second contacting means, the bolt being adjustable to apply a force to the first and second contacting means.

The force on both contacting means can therefore be adjusted by a single component, simplifying the assembly and the application of the force.

The apertures housing the pins may extend radially outwards from the bore.

The bolt may include a head at a first end of the bolt and a nut which is adjustably positionable towards a second end of the bolt, adjustment of the nut altering the force applied by the bolt.

A spring may be interposed between the nut and resilient contact member, the spring applying the force to the first and second contacting means.

The bolt head may form the chamfered element which contacts the radially-adjustable pins, the combination of the force and chamfered element ensuring that the radially-adjustable pins eliminate free play between the first shaft and the second shaft.

One of the first and second contacting members may be a damper device for absorbing energy in the event of a collapse of the steering column assembly.

Other advantages of this invention will become apparent to those skilled in the art from the following detailed description of the preferred embodiments, when read in light of the accompanying drawings.

BRIEF DESCRIPTION OF THE DRAWINGS

FIG. 3 is a cross-sectional view of the steering column assembly of FIG. 2, along line A-A;

FIG. 4 is a detail view of section C of FIG. 3;

FIG. 5 is a lateral view of the contacting means of the steering column assembly of FIG. 1;

FIG. 6 is a perspective view of the first shaft of the steering column assembly of FIG. 1; and FIG. 7 is a perspective view of the second shaft of the steering column assembly of FIG. 1.

DETAILED DESCRIPTION OF THE INVENTION

Figure 1:
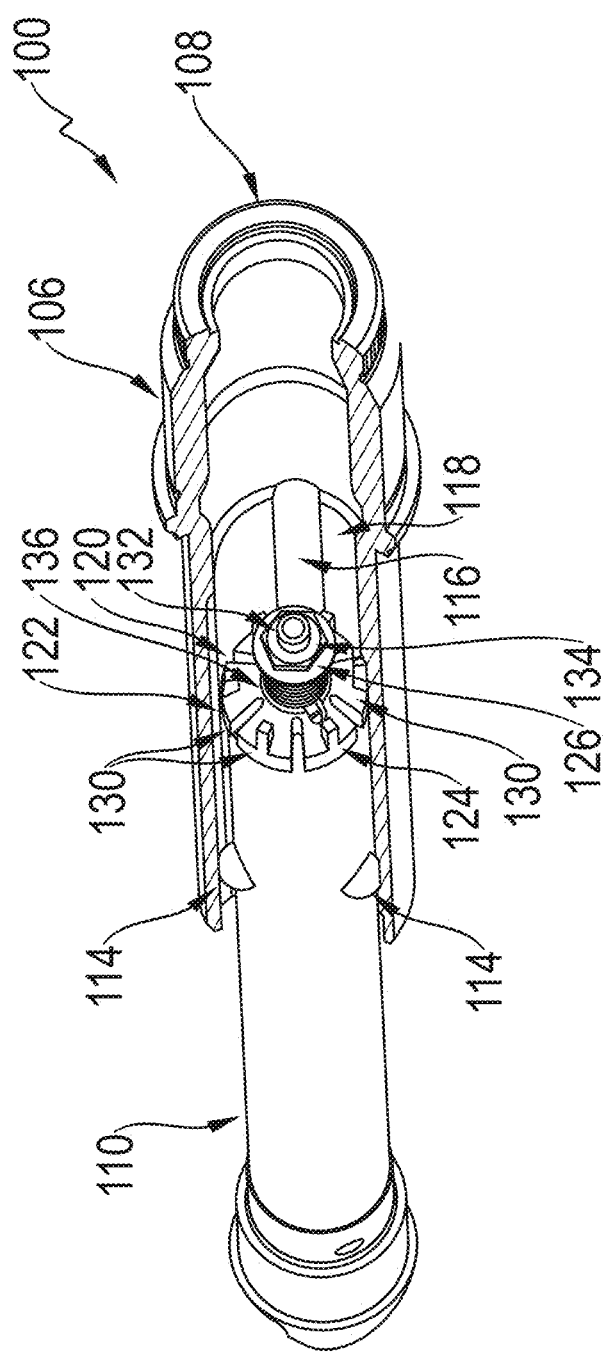
FIG. 1 is a perspective view of a steering column assembly in accordance with the invention.
Figure 2:
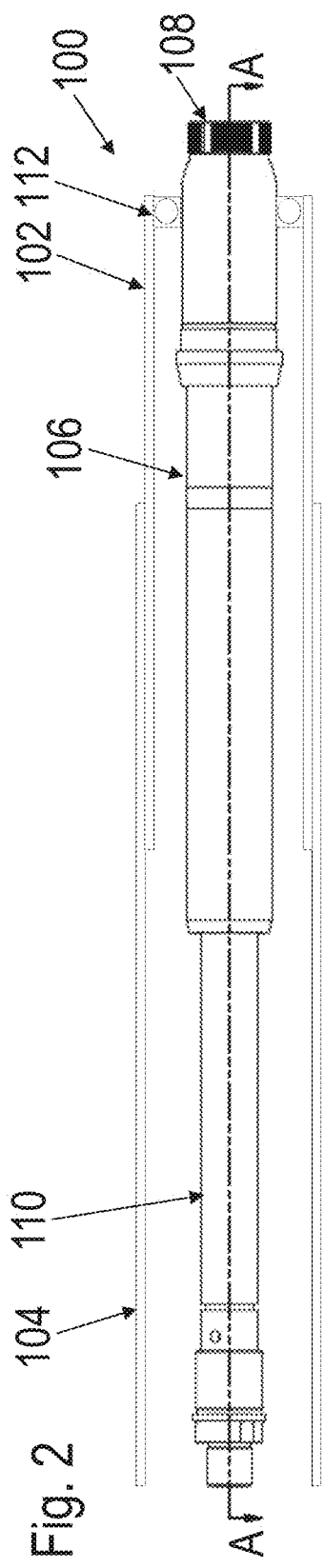
FIG. 2 is a plan view of the steering column assembly of FIG. 1.

Referring to the Figures, there is shown a collapsible steering column assembly 100 comprising a two-part telescopic steering shaft that is supported within a steering column shroud (shown only in FIG. 2). The shroud includes an upper part 102 that is located closest to a steering wheel (not shown) and a lower part 104 that is located furthest from the steering wheel and is secured to a housing of a gearbox (not shown). The shroud supports the steering shaft which comprises a first shaft 106 that is closest to the steering wheel and terminates at an upper end with a splined coupling 108 for receiving a hub of the steering wheel. The end of the first shaft 106 that is furthest from the steering wheel is hollowed out for the receipt of a second shaft 110. A bearing assembly 112 is interposed between the first shaft 106 and the upper part 102 of the shroud.

The second shaft 110 has an end that is located within the hollow end of the first shaft 106. The second shaft 110 is interconnected with the first shaft 106 by an engagement means for both transferring torque between the first shaft 106 and second shaft 110 and also eliminating any free play which may occur due to manufacturing tolerances or the like.

In order to transfer torque between the first shaft 106 and the second shaft 110, a torque transfer device comprising a plurality of pins 114 is provided, the pins 114 protruding from the second shaft 110 and positively engaging or interlocking with corresponding grooves 116 in an inwardly-facing wall 118 of the first shaft 106. The grooves 116 are parallel to a longitudinal axis of the first shaft 106 in order to allow adjustment of the assembly 100 for reach. The pins 114 are movable in a radial direction relative to the second shaft 110. This allows the pins 114 to be adjusted in order to engage effectively with the grooves 116 even when manufacturing tolerances or minor imperfections are taken into account. In use, the pins 114 are therefore biased in an outward radial direction, to ensure maximum engagement. The means by which this biasing is achieved is explained below.

In the present embodiment, three pins 114 are shown which engage with three corresponding grooves 116. This is the minimum necessary to ensure that the pins can transfer torque and effectively eliminate free play between the first shaft 106 and the second shaft 110. A greater number of pins 114 and grooves 116 may be utilised, if desired. The pins 114 are positioned evenly around the circumference of the second shaft 110, at 120 degree intervals. Again, this is the most effective arrangement of pins 114 which ensures even loading when the pins are keyed into the grooves, but different arrangements and positions may also be used, with the pins 114 separated with even or uneven spacing around the circumference of the second shaft 110.

The pins 114 themselves are obround in cross-section, having hemispherical ends joined with a cylindrical body. The grooves 116 are therefore complementarily-shaped to have the same or substantially the same radius as the hemispherical ends of the pins 114.

Secured to the end of the second shaft 110, within the hollow end of the first shaft 106, is a damper device 120. The damper device 120 of the present embodiment performs two functions. The first is to remove radial play between the first shaft 106 and second shaft 110, and the second is to control energy during a collapse. The damper device 120 therefore functions as an anti-vibration device to reduce vibration-induced rattle of the two parts of the steering shaft.

Both the damper device 120 and the pins 114 can therefore be termed contacting means for eliminating free play between the first shaft 106 and the second shaft 110. Providing two axially separated contacting means gives greater stability to the steering column assembly 100 than would be possible with a single contacting means. Whilst, in the present embodiment, only the pins 114 are configured to transmit torque, it is possible to provide both contacting means with this ability, if desired. Additional contacting means which reduce free play, transmit torque, or both, could also be provided.

During normal use of the steering column assembly 100, the damper device 120 occupies a space between the second shaft 110 and the inside of the hollow portion of the first shaft 106, making contact with the inwardly-facing wall 118 of the first shaft 106 and helping to prevent excess vibration of the steering shaft by modifying the resonant frequency of the two-part shaft. To do this, the damper device 120 must ensure that there is no gap between the damper device 120 and the inwardly-facing wall 118 and ideally the damper device 120 applies a very light pressure onto the inwardly-facing wall 118 with zero free play so that no radial movement of the second shaft 110 relative to the first shaft 106 is possible in the region where the damper device 120 is located. The damper device 120 is designed such that it remains in contact with the inwardly-facing wall 118 over the full normal range of reach adjustment of the steering column assembly 100.

As the damper device 120 is located axially remote from the torque transfer device, the free play between the first shaft 106 and the second shaft 110 is removed at two axially-separated locations. This gives better stability of the two shafts 106, 110 and allows ensures that minimum vibration is possible, during use.

The damper device comprises a resiliently deformable contact member 122 having a radially outermost edge 124 that lies at a constant radius from the axis of the second shaft 110 so that all parts of the outermost edge 124 lie on the desired circular path and thus can contact the inwardly-facing wall 118 of the first shaft 106, in use. The contact member 122 is secured to the second shaft 110 by a fastener 126. The contact member 122 has a generally frusta-conical shape with an inner diameter and an outer diameter. More specifically, the contact member 122 comprises a hub portion 128 and a plurality of radially-extending fingers or petals 130 that project away from the hub portion 128 and form the generally conical shape. Six petals 130 are shown, the outermost edge of each petal 130 lying on the circular path and forming a set of six arcs, each spanning about 50 degrees of the circular path. The regions between the petals 130 are cut away back to the hub portion 128 of the contact member 122. The petals 130 define the cone shape.

The fastener 126 comprises a bolt 132, a nut 134, and a spring 136 and acts not only to secure the contact member 122 to the second shaft 110 but also acts to bias both the pins 114 and the contact member 122 such that they remove the free play between the first shaft 106 and second shaft 110. The bolt 132 is received within a bore 138 in the second shaft 110 which extends axially through the second shaft 110 from the end at which the damper device 120 is attachable. At a distal end of the bore 138, the second shaft 110 includes three apertures 140, through each of which one of the pins 114 protrudes.

The bolt 132 includes a head 142 and a shaft 144, the head 142 being located within the bore 138 and the shaft 144 protruding out of the bore 138. The head 142 includes a chamfered face 146 which contacts the pins 114. Thus, by varying the position of the bolt 132 within the bore 138, the chamfered face 146 applies a force to the pins 114 which forces them radially outwards through the apertures 140. The shaft 144 of the bolt 132 includes a screw-threaded portion 148 onto which the nut 134 is screwed.

The bolt 132 passes through a hole 150 in the hub portion 128 of the contact member 122 and the petals 130 contact the second shaft 110 whilst the hub portion 128 is held clear. A biasing means, which in this case is the coil spring 136, is interposed between the nut 134 and the hub portion 128 of the contact member 122. As such, when the nut 134 is tightened, the spring 136 applies a force to the hub portion 128 which pushes the hub portion 128 towards the second shaft 110. Each petal 130 acts as a leaf spring and is deformed by this contact, causing the outermost edge 124 of the petals 130 to splay outwards.

The region of the second shaft 110 that contacts the petals 130 in this example is chamfered, ensuring the petals 130 can slide smoothly over the end of the second shaft 110 as the nut 134 is tightened. The chamfer 150 in effect defines a cone shape that complements the cone shape of the contact member 122, the cone formed by the second shaft 110 being forced into the cone of the contact member 122 by the bolt 132.

Simultaneously, the spring 136 will exert an equal force on the nut 134. This force will encourage the nut 134 and thus the bolt 132 in a direction away from the second shaft 110. In so doing, the head 142 of the bolt 132 will be pulled towards the damper device 120 and the chamfered face 146 will exert a force on the pins 114, biasing them outwards. The spring 136 therefore applies a force which removes the free play between the first shaft 106 and second shaft 110 at two different axial locations. By adjusting the position of the nut 134 on the screw-threaded portion 148 of the bolt 132, and therefore the tension of the spring 136, the force applied can be adjusted as required. The amount of tension in the spring 136 and bolt 132 determines how much the contact member 122 is splayed and this sets the diameter of the circular path on which the outermost edge 124 of the petals 130 lies.

In this example, the spring 136 is optional. Instead, it is possible for the tension to be set through direct contact between the nut 134 and the hub portion 128 of the contact member 122. In this case, the adjustment would still result in adjustment of both the pins 114 and the contact member 122, with the contact member 122 essentially acting as a spring to store the energy of the tightening. By omitting the spring 136, the assembly 100 would be simpler, however the petals 130 may exert a higher than necessary force on the inwardly-facing wall 118 of the first shaft 106, making it harder to adjust the steering column assembly 100 for reach. The spring 136 can also ensure that the contact member 122 and pins 114 always contact the first shaft 106, even if one or both of these subassemblies are worn through use.

When the spring 136 is present, there is no need to tighten the nut 134 after assembly of the steering column assembly 100. It can be set at an exactly specified position which ensures correct spring tension before the column is assembled and in the next step on the assembly line, the column can be assembled. The petals 130 of the contact member 122 will deform a small amount, along with the coil spring 136, to allow the contact member 122 to fit perfectly in the hollow end of the first shaft 106.

The secondary function of the damper device 120 is to absorb energy during a collapse of the steering column assembly 100. Upon collapse, the second shaft 110 is forced further into the first shaft 106. By including a narrowing in the hollow of the first shaft 106, the resilient contact member 122 essentially acts as a brake as it contacts the narrowing, and energy can be absorbed. Furthermore, horns 152 of the contact member 122, which extend forwards from the petals 130, parallel to the bolt 132, in use, can also be used. These horns 152, when entering the narrowing, deform which causes the petals 130 to push radially outwards, also managing energy dissipation in the collapse.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A collapsible steering column assembly comprising a telescopic steering shaft that is supported within a steering column shroud, the telescopic steering shaft comprising:
   a first shaft having a hollow end;
   a second shaft that has an end that is located within the hollow end of the first shaft; and a first contacting means and a second contacting means, axially separated along a longitudinal axis of the steering column assembly, each being adjustable for the elimination of free play between the first shaft and the second shaft, the first contacting means being adapted to transmit torque by rotationally interlocking the first shaft and the second shaft;

the first contacting means including a plurality of radially-adjustable pins, each pin being placed under a static force by a chamfered element that contacts an inner radial end of each pin, the chamfered element being biased in a direction such that the radially-adjustable pins are biased in a radially-outward direction, the radially-adjustable pins transmitting torque between the first shaft and second shaft.

2. The collapsible steering column assembly as claimed in claim 1, wherein each pin is receivable within a corresponding groove in an inwardly-facing wall of the first shaft.

3. The collapsible steering column assembly as claimed in claim 2, wherein each pin is located in an aperture in the second shaft.

4. The collapsible steering column assembly as claimed in claim 1, wherein the second contacting means includes a resilient contact member that is placed under a force, a magnitude of the force setting an outer dimension of the resilient contact member.

5. The collapsible steering column assembly as claimed in claim 4, wherein the resilient contact member contacts an inwardly-facing wall of the first shaft.

6. The collapsible steering column assembly as claimed in claim 5, wherein the resilient contact member includes a hub portion and a plurality of radially-extending fingers or petals that project away from the hub portion and form a generally conical or frusto-conical shape, the force causing the petals to splay to contact the inwardly-facing wall.

7. The collapsible steering column assembly as claimed in claim 4, wherein the second shaft includes a bore, a bolt being receivable within the bore and interconnecting the first and second contacting means, the bolt being adjustable to apply a force to the first and second contacting means.

8. The collapsible steering column assembly as claimed in claim 7, wherein the bolt includes a head at a first end of the bolt and a nut which is adjustably positionable towards a second end of the bolt, adjustment of the nut altering the force applied by the bolt.

9. The collapsible steering column assembly as claimed in claim 8, wherein a spring is interposed between the nut and resilient contact member, the spring applying the force to the first and second contacting means.

10. The collapsible steering column assembly as claimed in claim 8, wherein the head forms the chamfered element which contacts the radially-adjustable pins, the combination of the force and chamfered element ensuring that the radially-adjustable pins eliminate free play between the first shaft and second shaft.

11. The collapsible steering column assembly as claimed in claim 1, wherein one of the first and second contacting means is a damper device for absorbing energy in the event of a collapse of the steering column assembly.

12. A collapsible steering column assembly comprising a telescopic steering shaft that is supported within a steering column shroud, the telescopic steering shaft comprising:

a first shaft having a hollow end;

a second shaft having a bore and an end that is located within the hollow end of the first shaft;

a first contacting means and a second contacting means, axially separated along a longitudinal axis of the steering column assembly, each being adjustable for the elimination of free play between the first shaft and the second shaft, the first contacting means being adapted to transmit torque by rotationally interlocking the first shaft and the second shaft; and a bolt being receivable within the bore in the second shaft and interconnecting the first and second contacting means, the bolt being adjustable to apply a force to the first and second contacting means.

13. The collapsible steering column assembly as claimed in claim 12, wherein the first contacting means includes a plurality of radially-adjustable pins, each pin being located in an aperture in the second shaft, each pin being placed under a static force and being receivable within a corresponding groove in an inwardly-facing wall of the first shaft, the radially-adjustable pins transmitting torque between the first shaft and second shaft.

14. The collapsible steering column assembly as claimed in claim 13, wherein the radially-adjustable pins are placed under the static force by a chamfered element that contacts an inner radial end of each pin, the chamfered element being biased in a direction such that the radially-adjustable pins are biased in a radially-outward direction.

15. The collapsible steering column assembly as claimed in claim 12, wherein the second contacting means includes a resilient contact member that is placed under a force, a magnitude of the force setting an outer dimension of the resilient contact member, the resilient contact member contacting an inwardly-facing wall of the first shaft.

16. The collapsible steering column assembly as claimed in claim 15, wherein the resilient contact member includes a hub portion and a plurality of radially-extending fingers or petals that project away from the hub portion and form a generally conical or frusto-conical shape, the force causing the petals to splay to contact the inwardly-facing wall.

17. The collapsible steering column assembly as claimed in claim 15, wherein the bolt includes a head at a first end of the bolt and a nut which is adjustably positionable towards a second end of the bolt, adjustment of the nut altering the force applied by the bolt.

18. The collapsible steering column assembly as claimed in claim 17, wherein a spring is interposed between the nut and resilient contact member, the spring applying the force to the first and second contacting means.

19. The collapsible steering column assembly as claimed in claim 17, wherein the head forms a chamfered element which contacts a plurality of radially-adjustable pins of the first contacting means, each pin being located in an aperture in the second shaft, each pin being placed under a static force and transmitting torque between the first shaft and second shaft, the chamfered element contacting an inner radial end of each pin, the chamfered element being biased in a direction such that the radially-adjustable pins are biased in a radially-outward direction, the combination of the force and chamfered element ensuring that the radially-adjustable pins eliminate free play between the first shaft and second shaft.

* * * * *